US012152655B2

(12) United States Patent
Shoji et al.

(10) Patent No.: US 12,152,655 B2
(45) Date of Patent: Nov. 26, 2024

(54) MATING CHAIN AND MOVABLE BODY TRANSFER DEVICE

(71) Applicants: TSUBAKIMOTO CHAIN CO., Osaka (JP); TSUBAKIMOTO KOGYO CO., LTD., Osaka (JP)

(72) Inventors: Ryuta Shoji, Osaka (JP); Tamaki Shiki, Osaka (JP); Shunji Sakura, Osaka (JP); Toshimitsu Sakai, Osaka (JP)

(73) Assignees: TSUBAKIMOTO CHAIN CO., Osaka (JP); TSUBAKIMOTO KOGYO CO., LTD., Osaka (JP)

( * ) Notice: Subject to any disclaimer, the term of this patent is extended or adjusted under 35 U.S.C. 154(b) by 0 days.

(21) Appl. No.: 17/766,542

(22) PCT Filed: Oct. 8, 2020

(86) PCT No.: PCT/JP2020/038081
§ 371 (c)(1),
(2) Date: Apr. 5, 2022

(87) PCT Pub. No.: WO2021/070886
PCT Pub. Date: Apr. 15, 2021

(65) Prior Publication Data
US 2024/0052912 A1    Feb. 15, 2024

(30) Foreign Application Priority Data

Oct. 9, 2019  (JP) ................................. 2019-185671

(51) Int. Cl.
F16G 13/20    (2006.01)

(52) U.S. Cl.
CPC .................................... *F16G 13/20* (2013.01)

(58) Field of Classification Search
CPC ........................................................ F16G 13/20
See application file for complete search history.

(56) References Cited

U.S. PATENT DOCUMENTS 3,645,146 A * 2/1972 Nagin ..................... F16G 13/06
254/133 R
2010/0059727 A1 3/2010 Suko et al.
(Continued)

FOREIGN PATENT DOCUMENTS

| JP | 2008-256202 A | 10/2008 |
| JP | 2010-65721 A  | 3/2010  |

(Continued)

OTHER PUBLICATIONS

International Search Report dated Nov. 17, 2020, issued in counterpart application No. PCT/JP2020/038081 (2 pages).

*Primary Examiner* — Mohammed S. Alawadi
(74) *Attorney, Agent, or Firm* — WHDA, LLP

(57) ABSTRACT

An engagement chain includes a pair of first and second chain members that are engaged so as to be integrated with each other by moving in an advancing direction and disengaged from each other so as to bifurcate by moving in a retreating direction from the integrated engaged state. A first link plate of the first chain member includes first and second pin holes through which a coupling pin is inserted. A second link plate of the second chain member includes first and second pin holes through which a coupling pin is inserted. A first distance between the first and second pin holes of the first link plate is shorter than a second distance between the first and second pin holes of the second link plate.

5 Claims, 6 Drawing Sheets

(56) References Cited

U.S. PATENT DOCUMENTS

| | | | |
|---|---|---|---|
| 2010/0140572 A1* | 6/2010 | Aoki | F16G 13/20 |
| | | | 474/217 |
| 2013/0283945 A1* | 10/2013 | Kaisaku | B66F 13/005 |
| | | | 74/89.21 |
| 2013/0298705 A1* | 11/2013 | Saji | F16H 19/04 |
| | | | 74/30 |
| 2018/0216703 A1* | 8/2018 | Etori | B66F 7/28 |

FOREIGN PATENT DOCUMENTS

| | | |
|---|---|---|
| JP | 2013-36515 A | 2/2013 |
| JP | 2018-65634 A | 4/2018 |

* cited by examiner

MATING CHAIN AND MOVABLE BODY TRANSFER DEVICE

TECHNICAL FIELD

The present disclosure relates to an engagement chain and a movable body movement device that moves a movable body using the engagement chain.

BACKGROUND ART

Patent Literature 1 discloses an example of such a conventionally known movable body movement device. The movable body movement device includes an engagement chain and a movable body. The engagement chain includes pairs of chain members that are capable of selectively advancing and retreating. Each pair of the two chain members are engaged so as to be integrated with each other by moving in the advancing direction and are disengaged from each other so as to bifurcate by moving in the retreating direction from an engaged state in which the chain members are integrated with each other. The movable body includes, for example, a lifting table coupled to an end of the engagement chain on the leading side in the advancing direction. When the engagement chain selectively advances and retreats in the engaged state, in which the two chain members are engaged with each other, the movable body is moved in the advancing/retreating direction.

CITATION LIST

Patent Literature

Patent Literature 1: Japanese Laid-Open Patent Publication No. 2018-65634

SUMMARY OF INVENTION

Technical Problem

In the above-described movable body movement device, in a case where the chain members are engaged so as to be integrated with each other when moving in the advancing direction, the engaged chain members are switched to the engaged state, in which the chain members are integrated into a straight bar. Thus, the direction in which the engagement chain selectively advances and retreats in the engaged state, in which the two chain members are engaged so as to be integrated into a straight bar, is a direction in which the engagement chain extends straight along the engaged portion integrated into a straight bar. That is, the engagement chain with the two chain members engaged so as to be integrated into a straight bar and the movable body coupled to the engagement chain are moved straight. Accordingly, the needs for the engagement chain with the two chain members engaged so as to be integrated with each other and the movable body coupled to the engagement chain to move along a curved movement path have not been satisfied. This is a problem to be solved.

Solution to Problem

Means and operational advantages for solving the above-described problem will now be described.

An engagement chain that solves the above-described problem includes at least two chain members that are capable of selectively advancing and retreating. The two chain members form a pair. The two chain members are engaged so as to be integrated with each other by moving in an advancing direction and disengaged from each other so as to bifurcate by moving in a retreating direction from an engaged state in which the chain members are integrated with each other. Each of the chain members includes link plates and coupling pins. The link plates each include a first pin hole and a second pin hole arranged in an advancing/retreating direction. The link plates are arranged in series such that the first pin hole of one of the link plates and the second pin hole of an other one of the link plates adjacent to the one of the link plates in the advancing/retreating direction overlap each other. The link plates are pivotally coupled to each other by the coupling pins inserted through the first pin holes and the second pin holes with the link plates arranged in series. One of the two chain members is referred to as a first chain member, and an other one of the two chain members is referred to as a second chain member. The link plates of the first chain member are each referred to as a first link plate and the link plates of the second chain member are each referred to as a second link plate. A distance between the first pin hole and the second pin hole of the first link plate is referred to as a first distance, and a distance between the first pin hole and the second pin hole of the second link plate is referred to as a second distance. The first distance is shorter than the second distance.

In this structure, when the two chain members are engaged so as to be integrated with each other by moving in the advancing direction, the engagement chain is integrated into a curved shape such that the chain member with a relatively short distance between the first and second pin holes of the link plate of the chain member is located on the inner peripheral side. That is, the engagement chain is in the engaged state, in which the first chain member and the second chain member are integrated into a curved shape such that the first chain member is located on the inner peripheral side and the second chain member is located on the outer peripheral side. Thus, in the engaged state, in which the first chain member and the second chain member are integrated into a curved shape, the engagement chain is capable of selectively advancing and retreating along a curved movement path having a predetermined curvature that corresponds to the curved shape. This allows the movable body coupled to the engagement chain to move along the curved movement path in the same manner.

In the engagement chain, the following structure is preferred. The first link plates each include a first engagement part and a first mating part. The first engagement part is located at an end of the first link plate on a leading side in the advancing direction. The first mating part is located at an end of the first link plate on a leading side in the retreating direction. The first engagement part of each of the first link plates includes a first recess and a first projection. The first recess is notched such that the retreating direction coincides with a depth direction of the first recess. The first projection protrudes from a position located on an opposite side of the first recess from the first pin hole and the second pin hole of the first link plate when the first recess is viewed in the advancing direction such that the advancing direction coincides with a protruding direction of the first projection. The second link plates each include a second engagement part and a second mating part. The second engagement part is located at an end of the second link plate on the leading side in the retreating direction and being engageable with the first engagement part. The second mating part is located at an end of the second link plate on the leading side in the advancing direction and being capable of mating with the first mating part. The second engagement part of each of the second link plates includes a second recess and a second projection. The second recess is notched such that the advancing direction coincides with a depth direction of the second recess and such that the first projection of the first engagement part is insertable into the second recess. The second projection protrudes from a position located on an opposite side of the second recess from the first pin hole and the second pin hole of the second link plate when the second recess is viewed in the retreating direction such that the retreating direction coincides with a protruding direction of the second projection and such that the second projection is insertable into the first recess of the first engagement part. The first mating part of each of the first link plates includes an end face of the first link plate. The second mating part of each of the second link plates includes an end face of the second link plate. The end face of the first mating part and the end face of the second mating part extend in a direction intersecting obliquely with respect to the advancing/retreating direction. A direction that is orthogonal to a direction in which the first mating part and the second mating part extend is referred to as an orthogonal direction. A distance between the first mating part and a bottom of the first recess of the first engagement part in the orthogonal direction is referred to as a first recess-side distance. A distance between the second mating part and a tip of the second projection of the second engagement part in the orthogonal direction is referred to as a second projection-side distance. A distance between the first mating part and a tip of the first projection of the first engagement part in the orthogonal direction is referred to as a first projection-side distance. A distance between the second mating part and a bottom of the second recess of the second engagement part in the orthogonal direction is referred to as a second recess-side distance. A sum of the first recess-side distance and the second projection-side distance is smaller than a sum of the first projection-side distance and the second recess-side distance.

In the engagement chain, it is preferred that the first mating part be in planar contact with the second mating part when the first chain member and the second chain member are engaged so as to be integrated with each other.

In the engagement chain, the following structure is preferred. As viewed in an axial direction of the first pin hole and the second pin hole of each of the first link plates, the end face of the first mating part in the first link plate defines an upward slope toward the leading side in the advancing direction from a side where the first pin hole and the second pin hole are located. As viewed in an axial direction of the first pin hole and the second pin hole of each of the second link plates, the end face of the second mating part in the second link plate defines a downward slope toward the leading side in the retreating direction from a side where the first pin hole and the second pin hole are located. An acute angle at which the first mating part intersects a straight line connecting the first pin hole and the second pin hole of the first link plate to each other is referred to as a first angle. An acute angle at which the second mating part intersects a straight line connecting the first pin hole and the second pin hole of the second link plate to each other is referred to as a second angle. The first angle is greater than the second angle.

A movable body movement device that solves the above-described problem includes the above-described engagement chain and a movable body coupled to the engagement chain and movable in the advancing/retreating direction together with the engagement chain.

In this structure, the movable body movement device has the same operational advantages as the above-described engagement chain.

Advantageous Effects of Invention

In the present disclosure, the engagement chain with the two chain members engaged so as to be integrated with each other and the movable body coupled to the engagement chain can be moved along a curved movement path.

DESCRIPTION OF EMBODIMENTS

An embodiment of an engagement chain and a movable body movement device that moves a movable body using the engagement chain will now be described with reference to the drawings.

Figure 1:
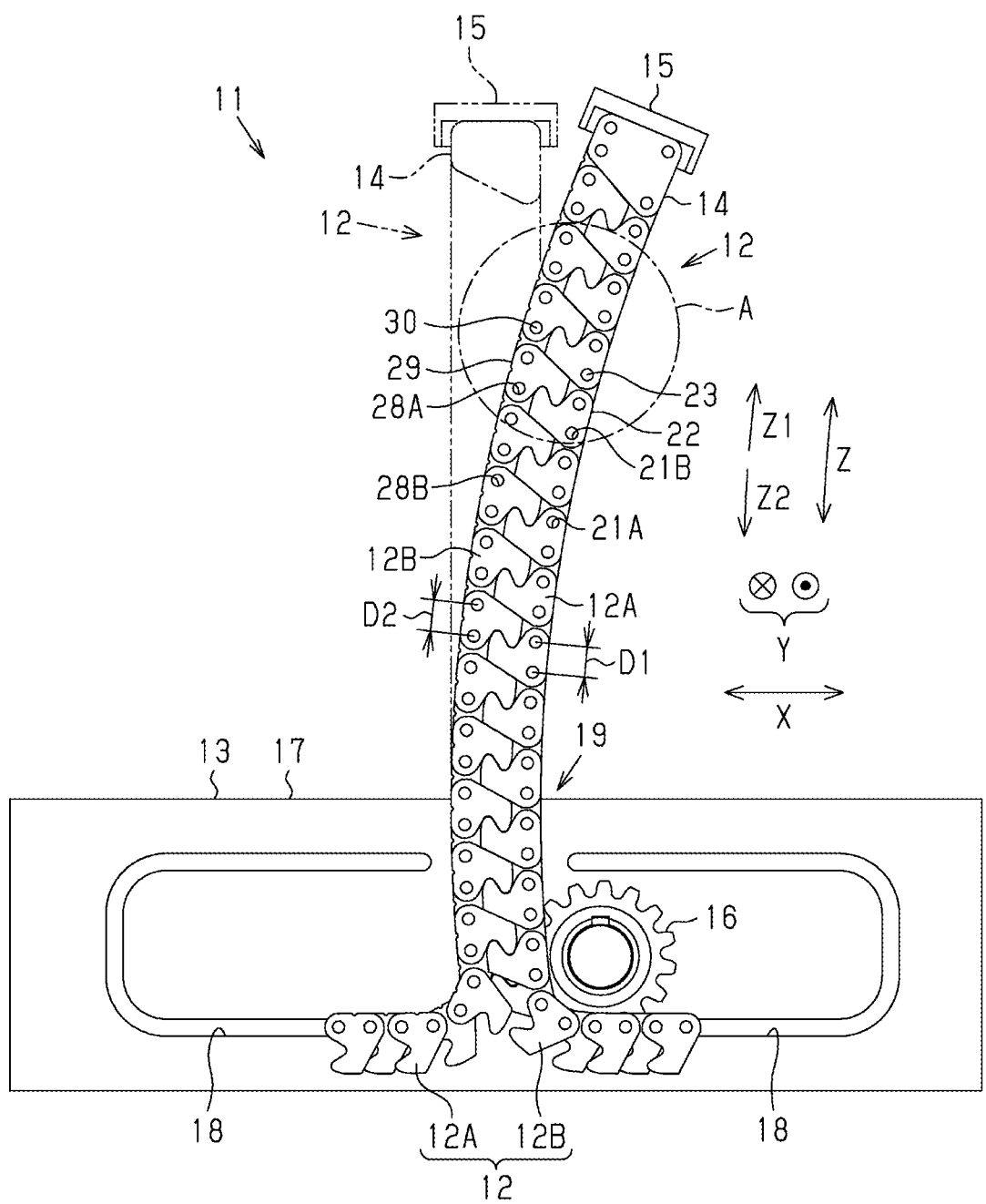
FIG. 1 is a front view schematically showing a movable body movement device according to an embodiment in a state in which a movable body is located on an upper position.
Figure 2:
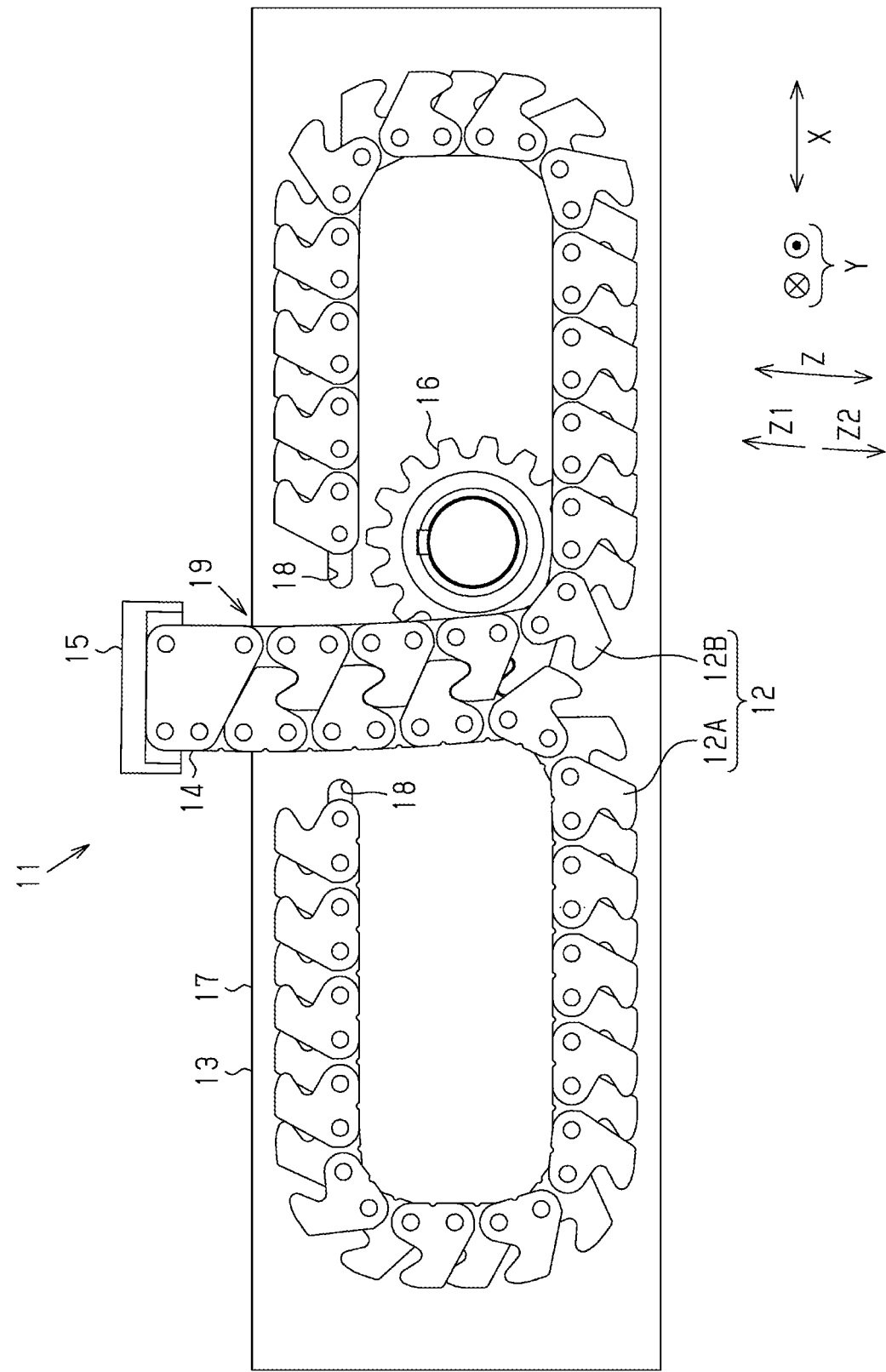
FIG. 2 is a front view schematically showing the movable body movement device in a state in which the movable body is located on a lower position.

As shown in FIGS. 1 and 2, a movable body movement device 11 includes an engagement chain 12 that is capable of selectively advancing and retreating in a longitudinal direction, an accommodating portion 13 that is arranged in a fixed state, and a movable body 15. The movable body 15 is coupled to the tip of the engagement chain 12 by a joint link 14. The engagement chain 12 includes a pair of chain members engageable with each other, namely, a first chain member 12A and a second chain member 12B. The engagement chain 12 is configured such that the first chain member 12A and the second chain member 12B, which are two chain members that form a pair, are engaged so as to be integrated with each other by moving in an advancing direction. Further, the engagement chain 12 is configured such that the first chain member 12A and the second chain member 12B are disengaged from each other so as to bifurcate by moving in a retreating direction from an engaged state in which the chain members are integrated with each other.

A functional member (e.g., a lifting table) is attached to the movable body 15.

The direction in which the engagement chain 12 selectively advances and retreats to move the movable body 15 is hereinafter referred to as the advancing/retreating direction Z. In this case, the direction in which the engagement chain 12 advances (the upward direction in FIG. 1) is hereinafter referred to as the advancing direction Z1. The direction in which the engagement chain 12 retreats (the downward direction in FIG. 1) is hereinafter referred to as the retreating direction Z2. Of the directions orthogonal to the advancing/retreating direction Z, the direction in which the first chain member 12A and the second chain member 12B are disengaged from each other so as to bifurcate when the engagement chain 12 moves in the retreating direction Z2 from the engaged state, in which the first chain member 12A and the second chain member 12B are engaged so as to be integrated with each other, is hereinafter referred to as the bifurcating direction X. The bifurcating direction X corresponds to the left-right direction in FIG. 1. The direction orthogonal to the advancing/retreating direction Z and the bifurcating direction X is hereinafter referred to as the front-rear direction Y. The front-rear direction Y corresponds to the direction orthogonal to the sheet surface of FIG. 1. FIGS. 1 and 2 show the internal configuration of the accommodating portion 13, with the illustration of the exterior of the accommodating portion 13 omitted.

As shown in FIGS. 1 and 2, the accommodating portion 13 is configured to accommodate the engagement chain 12. A sprocket 16 is arranged at a middle section in the accommodating portion 13 in the bifurcating direction X such that the sprocket 16 becomes engaged with the first chain member 12A, which is one of the chain members of the engagement chain 12. The sprocket 16 is rotatable about an axis that extends in the front-rear direction Y in forward and reverse directions. A motor (not shown) drives the sprocket 16 to rotate about the axis corresponding to the front-rear direction Y in the forward and reverse directions. As the sprocket 16 is driven to rotate, the engagement chain 12 selectively advances and retreats in the advancing/retreating direction Z so that the movable body 15 moves in the advancing/retreating direction Z.

The accommodating portion 13 includes a guide plate 17 that has a rectangular shape substantially identical to the shape of the exterior (not shown) of the accommodating portion 13 as viewed in the front-rear direction Y. Two guide grooves 18 are arranged in the inner side surface of the guide plate 17 in a manner substantially symmetrical in the left-right direction as viewed in FIGS. 1 and 2. The guide grooves 18 each have a reverse passage that is capable of guiding the corresponding one of the first chain member 12A and the second chain member 12B such that first chain member 12A and the second chain member 12B move in a reverse manner after bifurcating from each other from the engaged state.

Further, two guide grooves are arranged in the inner side surface of the exterior (not shown) of the accommodating portion 13 in correspondence with the two guide grooves 18 of the guide plate 17 in the front-rear direction Y. The guide grooves in the inner side surface have the same shape as the two guide grooves 18. Thus, the left and right inner side surfaces of the accommodating portion 13 in the front-rear direction Y are respectively provided with the two opposing guide grooves. An opening 19 is arranged at the substantially middle portion in the bifurcating direction X on the surface of the accommodating portion 13 on the leading side in the advancing direction Z1. The opening 19 allows the engaged portion of the engagement chain 12, in which the first chain member 12A and the second chain member 12B are engaged so as to be integrated with each other, to move in the advancing/retreating direction Z.

The first chain member 12A and the second chain member 12B of the engagement chain 12 will now be described.

The first chain member 12A, which is located on the right side in FIG. 1, include first link plates 22 (link plates) and columnar coupling pins 23. Each first link plate 22 includes circular first and second pin holes 21A, 21B that are spaced apart from each other by a first distance D1 in the advancing/retreating direction Z. Adjacent ones of the first link plates 22 in the advancing/retreating direction Z are pivotally coupled to each other in the first and second pin holes 21A, 21B by the coupling pins 23. That is, the first chain member 12A has an elongated shape when pairs of first link plates 22 are pivotally coupled to each other by the coupling pins 23 with the first link plates 22 arranged in series in the advancing/retreating direction Z. Each pair of the two first link plates 22 are arranged so as to oppose each other at a predetermined interval in the front-rear direction Y.

More specifically, the pairs of first link plates 22 include first link plates 22 paired at a relatively narrow interval in the front-rear direction Y and first link plates 22 paired at a relatively wide interval in the front-rear direction Y. In a state in which the first link plates 22 paired at a relatively narrow interval in the front-rear direction Y and the first link plates 22 paired at a relatively wide interval in the front-rear direction Y are alternately arranged in the longitudinal direction such that the first pin holes 21A of one pair of the first link plates 22 and the second pin holes 21B of the other pair of the first link plates 22 overlap each other in the front-rear direction Y, the coupling pins 23 are fitted in the pin holes 21A, 21B that overlap each other in the front-rear direction Y. The first chain member 12A is thus assembled. Accordingly, in the first chain member 12A, each one of the first link plates 22 paired at a relatively narrow interval on the inner side and the corresponding one of the first link plates 22 paired at a relatively wide interval on the outer side are located so as to be shifted from each other in the advancing/retreating direction Z by a single pitch of each coupling pin 23, which corresponds to the first distance D1 between the pin holes 21A, 21B.

In this case, a portion proximate to the end of each coupling pin 23 is tightly fitted in a non-rotatable manner in the pin holes 21A, 21B of each pair of the outer first link plates 22 located outward from the corresponding pair of the inner first link plates 22 at a relatively narrow interval. In contrast, a portion closer to the middle section of the coupling pin 23 than the end of the coupling pin 23 is loosely fitted in a rotatable manner in the pin holes 21A, 21B of each pair of the inner first link plates 22 located inward from the corresponding pair of the outer first link plates 22 at a relatively wide interval.

The opposite ends of the coupling pins 23 project outward from the outer first link plates 22 (outer link plates) paired at a relatively wide interval in the front-rear direction Y. To accommodate the first chain member 12A in the accommodating portion 13, the opposite ends of the coupling pins 30 are slidably inserted into the guide grooves opposing each other in the front-rear direction Y in the accommodating portion 13. That is, in a case where the first chain member 12A is moved in the retreating direction Z2 and accommodated in the accommodating portion 13, one end of each coupling pin 23 is inserted into the guide groove 18 in the guide plate 17 of the accommodating portion 13 whereas the other end of each coupling pin 23 is inserted into the guide groove in the inner surface of the exterior (not shown) of the accommodating portion 13.

Figure 3:
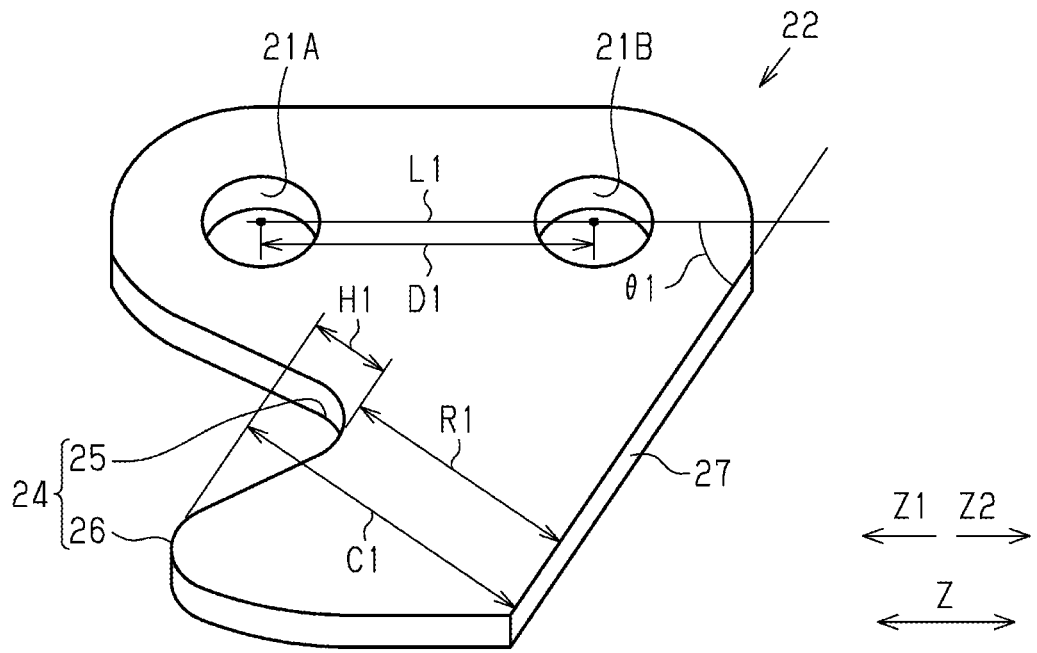
FIG. 3 is a perspective view showing a first link plate included in the first chain member of the engagement chain.

As shown in FIG. 3, the first link plate 22 includes a first engagement part 24 at an end of the first link plate 22 on the leading side in the advancing direction Z1. When the first chain member 12A and the second chain member 12B are engaged so as to be integrated with each other, engagement occurs at the first engagement part 24. The first engagement part 24 includes a curved end face that has a contour with a recess and a projection as viewed in the front-rear direction Y, which corresponds to the axial direction of each of the pin holes 21A, 21B. The curved end face of the first engagement part 24 is a part of an annular end face forming the entire contour of the first link plate 22.

The first engagement part 24 includes a first recess 25 of which the contour is recessed and a first projection 26 of which the contour is projected. The first recess 25 is notched into a substantially U-shape at the end of the first link plate 22 on the leading side in the advancing direction Z1 such that the retreating direction Z2 coincides with the depth direction of the first recess 25. When the first recess 25 is viewed from the leading side in the advancing direction Z1, the first projection 26 protrudes from a position located on the opposite side of the first recess 25 from the pin holes 21A, 21B such that the advancing direction Z1 coincides with the protruding direction of the first projection 26.

The first link plate 22 further includes a first mating part 27 at the end of the first link plate 22 on the leading side in the retreating direction Z2. As viewed in the front-rear direction Y, which coincides with the axial direction of the pin holes 21A, 21B, the first mating part 27 extends straight in a direction intersecting obliquely with respect to the advancing/retreating direction Z so as to form an inclined end face defining an upward slope toward the leading side in the advancing direction Z1 from a side where the pin holes 21A, 21B are located. The first mating part 27 includes a flat end face extending such that the front-rear direction Y, which coincides with the axial direction of the pin holes 21A, 21B, is the width direction of the first mating part 27 and the direction that is orthogonal to the front-rear direction Y is the length direction of the first mating part 27. The end face of the first mating part 27 is a part of the annular end face defining the entire contour of the first link plate 22 at a position opposite from the first engagement part 24 in the advancing/retreating direction Z.

The second chain member 12B, which is located on the left side in FIG. 1, includes second link plates 29 (link plates) and columnar coupling pins 30. Each second link plate 29 includes circular first and second pin holes 28A, 28B that are spaced apart from each other by a second distance D2 in the advancing/retreating direction Z. Adjacent ones of the second link plates 29 in the advancing/retreating direction Z are pivotally coupled to each other in the first and second pin holes 28A, 28B by the coupling pins 30. The second distance D2 between the first and second pin holes 28A, 28B of the second link plate 29 is greater than the above-described first distance D1 between the first and second pin holes 21A, 21B of the first link plate 22. That is, the first distance D1 between the first and second pin holes 21A, 21B of the first link plate 22 is shorter than the second distance D2 between the first and second pin holes 28A, 28B of the second link plate 29. The second chain member 12B has an elongated shape such that pairs of second link plates 29 are pivotally coupled to each other by the coupling pins 30 with the second link plates 29 arranged in series in the advancing/retreating direction Z. Each pair of the two second link plates 29 are arranged so as to oppose each other at a predetermined interval in the front-rear direction Y.

More specifically, in the same manner as the pairs of the first link plates 22, the pairs of second link plates 29 include second link plates 29 paired at a relatively narrow interval in the front-rear direction Y and second link plates 29 paired at a relatively wide interval in the front-rear direction Y. In a state in which the second link plates 29 paired at a relatively narrow interval in the front-rear direction Y and the second link plates 29 paired at a relatively wide interval in the front-rear direction Y are alternately arranged in the longitudinal direction such that the first pin hole 28A of one pair of the second link plates 29 and the second pin holes 28B of the other pair of the second link plates 29 overlap each other in the front-rear direction Y, the coupling pins 30 are fitted in the pin holes 28A, 28B that overlap each other in the front-rear direction Y. The second chain member 12B is thus assembled. Accordingly, in the second chain member 12B, each one of the second link plates 29 paired at a relatively narrow interval on the inner side and the corresponding one of the second link plates 29 paired at a relatively wide interval on the outer side are located so as to be shifted from each other in the advancing/retreating direction Z by a single pitch of each coupling pin 30, which corresponds to the second distance D2 between the pin holes 28A, 28B.

In this case, a portion proximate to the end of each coupling pin 30 is tightly fitted in a non-rotatable manner in the pin holes 28A, 28B of each pair of the outer second link plates 29 located outward from the corresponding pair of the inner second link plates 29 at a relatively narrow interval. In contrast, a portion closer to the middle section of the coupling pin 30 than the end of the coupling pin 30 is loosely fitted in a rotatable manner in the pin holes 28A, 28B of each pair of the inner second link plates 29 located inward from the corresponding pair of the outer second link plates 29 at a relatively wide interval in the front-rear direction Y.

The opposite ends of the coupling pins 30 project outward from the outer second link plates 29 (outer link plates) paired at a relatively wide interval in the front-rear direction Y. In the same manner as the first chain member 12A, to accommodate the second chain member 12B in the accommodating portion 13, the opposite ends of the coupling pins 30 are slidably inserted into the guide grooves opposing each other in the front-rear direction Y in the accommodating portion 13. That is, in a case where the second chain member 12B is moved in the retreating direction Z2 and accommodated in the accommodating portion 13, one end of each coupling pin 30 is inserted into the guide groove 18 in the guide plate 17 of the accommodating portion 13 whereas the other end of each coupling pin 30 is inserted into the guide groove in the inner surface of the exterior (not shown) of the accommodating portion 13.

Figure 4:
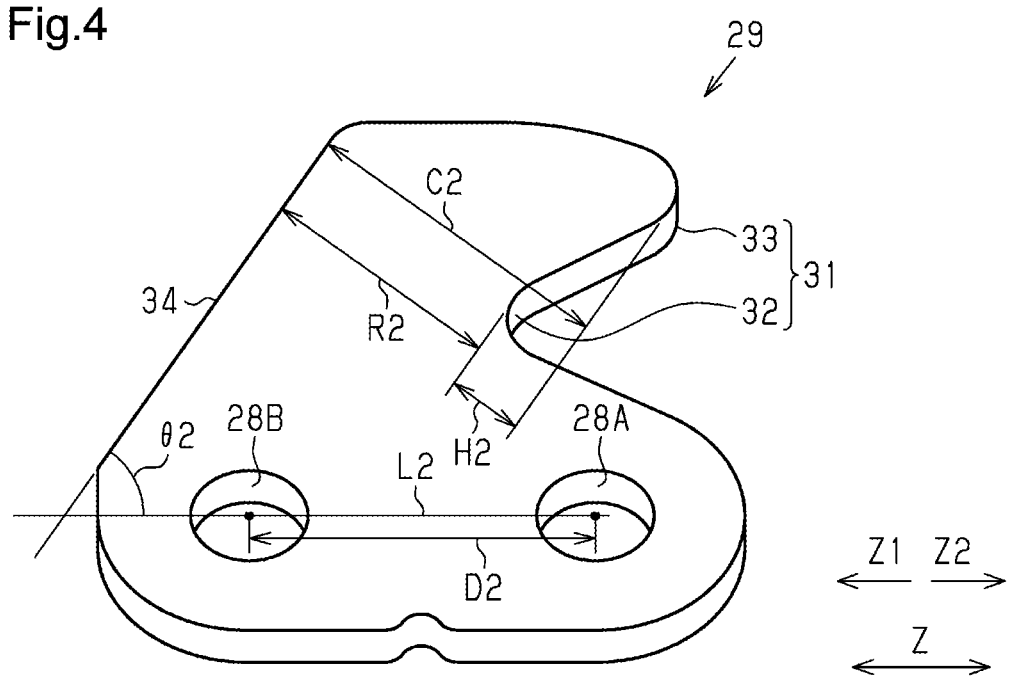
FIG. 4 is a perspective view showing a second link plate included in the second chain member of the engagement chain.

As shown in FIG. 4, the second link plate 29 includes a second engagement part 31 at an end of the second link plate 29 on the leading side in the retreating direction Z2. When the first chain member 12A and the second chain member 12B are engaged so as to be integrated with each other, engagement occurs at the second engagement part 31. The second engagement part 31 includes a curved end face that has a contour with a recess and a projection as viewed in the front-rear direction Y, which corresponds to the axial direction of each of the pin holes 28A, 28B. The curved end face of the second engagement part 31 is a part of an annular end face forming the entire contour of the second link plate 29.

The second engagement part 31 includes a second recess 32 of which the contour is recessed and a second projection 33 of which the contour is projected. The second recess 32 is notched into a substantially U-shape at the end of the second link plate 29 on the leading side in the retreating direction Z2 such that the advancing direction Z1 coincides with the depth direction of the second recess 32 and such that the first projection 26 of the first engagement part 24 of the first link plate 22 is insertable into the second recess 32. When the second recess 32 is viewed from the leading side in the retreating direction Z2, the second projection 33 protrudes from a position located on the opposite side of the second recess 32 from the pin holes 28A, 28B such that the retreating direction Z2 coincides with the protruding direction of the second projection 33 and such that the second projection 33 is insertable into the first recess 25 of the first engagement part 24 of the first link plate 22.

The second link plate 29 further includes a second mating part 34 at the end of the second link plate 29 on the leading side in the advancing direction Z1. As viewed in the front-rear direction Y, which coincides with the axial direction of the pin holes 28A, 28B, the second mating part 34 extends straight in a direction intersecting obliquely with respect to the advancing/retreating direction Z so as to form an inclined end face defining a downward slope toward the leading side in the retreating direction Z2 from a side where the pin holes 28A, 28B are located. In the same manner as the first mating part 27, the second mating part 34 includes a flat end face extending such that the front-rear direction Y, which coincides with the axial direction of the pin holes 28A, 28B, is the width direction of the second mating part 34 and the direction that is orthogonal to the front-rear direction Y is the length direction of the second mating part 34. The end face of the second mating part 34 is a part of the annular end face defining the entire contour of the second link plate 29 at a position opposite from the second engagement part 31 in the advancing/retreating direction Z.

When the first link plate 22 of the first chain member 12A is compared with the second link plate 29 of the second chain member 12B, the first distance D1 between the pin holes 21A, 21B of the first link plate 22 is different from the second distance D2 between the pin holes 28A, 28B of the second link plate 29. Further, the first link plate 22 and the second link plate 29 are different from each other in the following respects. The differences will now be described.

First, as shown in FIG. 3, in a direction (orthogonal direction) orthogonal to the extending direction of the first mating part 27 (inclined end face) of the first link plate 22, the distance between the bottom of the first recess 25 of the first engagement part 24 and the first mating part 27 is referred to as the first recess-side distance R1 and the distance between the tip of the first projection 26 and the first mating part 27 is referred to as the first projection-side distance C1. Further, the depth of the first recess 25 obtained by subtracting the first recess-side distance R1 from the first projection-side distance C1 is referred to as the first recess depth H1. Furthermore, in the first link plate 22, the acute angle at which the inclined first mating part 27 intersects a straight line L1 connecting the first and second pin holes 21A, 21B to each other is referred to as the first angle θ1.

Further, in a direction (orthogonal direction) orthogonal to the extending direction of the second mating part 34 (inclined end face) of the second link plate 29, the distance between the bottom of the second recess 32 of the second engagement part 31 and the second mating part 34 is referred to as the second recess-side distance R2 and the distance between the tip of the second projection 33 and the second mating part 34 is referred to as the second projection-side distance C2. Further, the depth of the second recess 32 obtained by subtracting the second recess-side distance R2 from the second projection-side distance C2 is referred to as the second recess depth H2. Furthermore, in the second link plate 29, the acute angle at which the inclined second mating part 34 intersects a straight line L2 connecting the first and second pin holes 28A, 28B to each other is referred to as the second angle θ2.

In this case, when the first link plate 22 is compared with the second link plate 29, the first link plate 22 and the second link plate 29 are different from each other in the following respects. That is, when the first recess-side distance R1 of the first link plate 22 is compared with the second recess-side distance R2 of the second link plate 29, the first recess-side distance R1 is shorter than the second recess-side distance R2. Further, when the first projection-side distance C1 of the first link plate 22 is compared with the second projection-side distance C2 of the second link plate 29, the first projection-side distance C1 is longer than the second projection-side distance C2. Furthermore, when the first recess depth H1 of the first link plate 22 is compared with the second recess depth H2 of the second link plate 29, the first recess depth H1 is greater than the second recess depth H2. In addition, when the first angle θ1 of the first link plate 22 is compared with the second angle θ2 of the second link plate 29, the first angle θ1 is greater than the second angle θ2.

Figure 5:
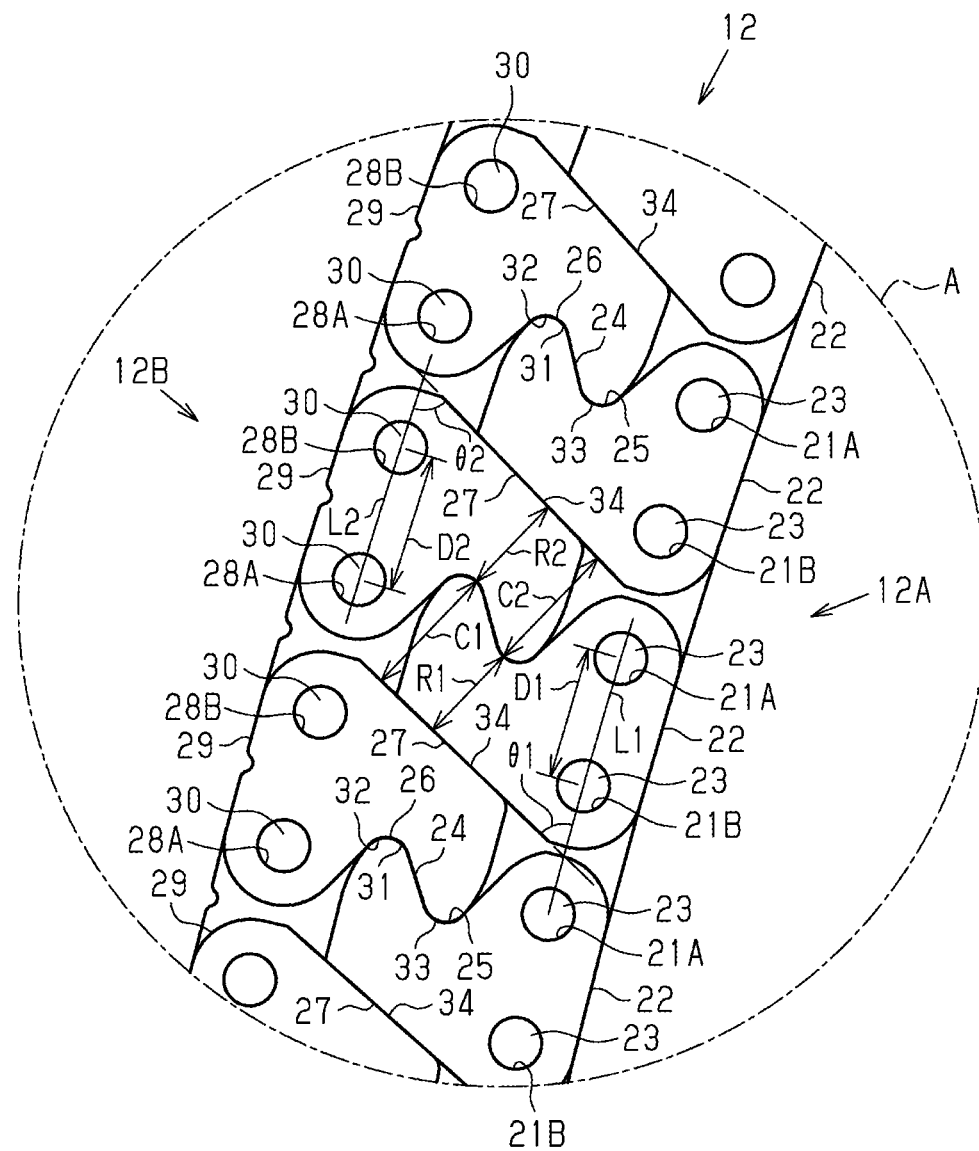
FIG. 5 is an enlarged front view of the engagement chain shown in FIG. 1.
Figure 5:
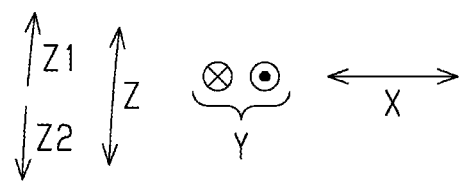

Based on the above-described condition, the first engagement part 24 of the first link plate 22 is engaged with the second engagement part 31 of the second link plate 29 and the first mating part 27 of the first link plate 22 is mated with the second mating part 34 of the second link plate 29 as shown in FIG. 5. In this state, the following differences in dimension occur. That is, the sum of the first recess-side distance R1 and the second projection-side distance C2 is shorter than the sum of the first projection-side distance C1 and the second recess-side distance R2 in the direction (orthogonal direction) that is orthogonal to the extending direction of the first mating part 27 and the second mating part 34. In the present embodiment, the above-described differences in dimension and structure between the first link plate 22 and the second link plate 29 cause the engagement chain 12 to be curved and integrated when the first chain member 12A is engaged with the second chain member 12B.

The operation of the present embodiment will now be described.

To switch the engagement chain 12 to the engaged state by engaging the first chain member 12A and the second chain member 12B to each other, the sprocket 16 is first driven to rotate in the clockwise direction as viewed in FIG. 2. This moves the pair of first chain member 12A and second chain member 12B on the left and right sides in the advancing direction Z1 while guiding the coupling pins 23, 30 to the pairs of guide grooves 18 on the left and right sides in the accommodating portion 13.

As shown in FIG. 1, as the first chain member 12A and the second chain member 12B move in the advancing direction Z1, the first link plates 22 and the second link plates 29 are engaged with each other so that the engagement chain 12 is switched to an engaged state of a rigid body structure integrated into a straight bar extending in the advancing/retreating direction Z. In this engaged state, the first engagement part 24 of each first link plate 22 of the first chain member 12A is engaged with the second engagement part 31 of the corresponding second link plate 29 of the second chain member 12B, and the first mating part 27 of the first link plate 22 is mated with the second mating part 34 of the second link plate 29.

More specifically, the first chain member 12A engages the second chain member 12B when the second projection 33 of the second engagement part 31 of each second link plate 29 is inserted into the first recess 25 of the first engagement part 24 of the corresponding first link plate 22 and the first projection 26 of the first engagement part 24 of the first link plate 22 is inserted into the second recess 32 of the second engagement part 31 of the second link plate 29. Further, the first chain member 12A and the second chain member 12B are switched to a mated state in which the inclined first mating part 27 of the first link plate 22 is in planar contact with the inclined second mating part 34 of the second link plate 29.

The first distance D1 is used to define the chain pitch of the first chain member 12A, and the second distance D2 is used to define the chain pitch of the second chain member 12B. In this case, the first distance D1 of the first chain member 12A is shorter than the second distance D2 of the second chain member 12B. Regarding the first recess 25 and the second recess 32 adjacent to each other in the left-right direction that intersects the advancing/retreating direction Z, the first recess depth H1 of the first recess 25 is greater than the second recess depth H2 of the second recess 32. Thus, the engagement chain 12 including the pair of the first chain member 12A and the second chain member 12B on the left and right sides are integrated into a curved bar as shown by the solid line in FIG. 1, not into a straight bar as shown by the long dashed double-short dashed line in FIG. 1. In the curved bar, the first chain member 12A with a short chain pitch and a deep recess is located the inner peripheral side.

In this case, in the first chain member 12A and the second chain member 12B in which the first engagement part 24 is engaged with the second engagement part 31, the sum of the first recess-side distance R1 and the second projection-side distance C2 on the inner peripheral side is smaller than the sum of the first projection-side distance C1 and the second recess-side distance R2 on the outer peripheral side. Further, the first angle θ1 is greater than the second angle θ2. Thus, in the engagement chain 12, the first chain member 12A and the second chain member 12B can be smoothly integrated into a curved bar in which the first chain member 12A is located on the inner peripheral side and the second chain member 12B is located on the outer peripheral side. This allows the engagement chain 12 to selectively advance and retreat along a curved movement path having a predetermined curvature that corresponds to the above-described curved shape. Accordingly, the movable body 15 coupled to the tip of the engagement chain 12 is also movable between the lower position shown in FIG. 2 and the upper position shown in FIG. 1 along the curved movement path.

In the state shown in FIG. 1, when the sprocket 16 is driven to rotate in the counterclockwise direction, the first chain member 12A and the second chain member 12B of the engagement chain 12 that are engaged and integrated with each other are moved in the retreating direction Z2. This also allows the engagement chain 12 to move in the retreating direction Z2 along the curved movement path having the predetermined curvature that corresponds to the curved shape in the engaged state. As the first chain member 12A and the second chain member 12B of the engagement chain 12 move in the retreating direction Z2 from the engaged state shown in FIG. 1, each first link plate 22 and the corresponding second link plate 29 are disengaged from each other so that the first chain member 12A and the second chain member 12B bifurcate in the bifurcating direction X. Consequently, the first chain member 12A and the second chain member 12B in the longitudinal direction are mostly guided to the symmetrical guide grooves 18 in the left-right direction and accommodated in the accommodating portion 13.

The advantages of the present embodiment will now be described.

(1) As the engagement chain 12 moves in the advancing direction Z1, the engagement chain 12 is switched to the engaged state. In this state, the first chain member 12A and the second chain member 12B are integrated into a curved shape such that the first chain member 12A is located on the inner peripheral side and the second chain member 12B is located on the outer peripheral side. This allows the engagement chain 12 to selectively advance and retreat along the curved movement path having the predetermined curvature that corresponds to the curved shape.

(2) The engagement chain 12 selectively advances and retreats along the curved movement path having the predetermined curvature that corresponds to the curved shape in the engaged state. This allows the movable body 15 coupled to the tip of the engagement chain 12 to move between the upper and lower positions along the curved movement path in the same manner. Thus, the functional member (e.g., lifting table) attached to the movable body 15 is movable along the curved movement path.

(3) The first recess 25 of the first engagement part 24 of each first link plate 22 of the first chain member 12A has a greater depth than the second recess 32 of the second engagement part 31 of the corresponding second link plate 29 of the second chain member 12B. Further, the first projection 26 of the first engagement part 24 of the first link plate 22 of the first chain member 12A protrudes to a larger amount than the second projection 33 of the second engagement part 31 of the second link plate 29 of the second chain member 12B. Thus, when the first chain member 12A and the second chain member 12B are engaged so as to be integrated into a bar, the first engagement part 24 and the second engagement part 31 are engaged with each other to a greater extent on a side of the engagement chain 12 where the first recess 25, which is relatively deep. As a result, the first chain member 12A and the second chain member 12B are easily integrated into a bar curved toward the first chain member 12A.

(4) When the first chain member 12A and the second chain member 12B are engaged so as to be integrated with each other, the engagement chain 12 is switched to the mated state. In this state, each inclined first mating part 27 is in planar contact with the corresponding inclined second mating part 34. This stably maintains the engaged state, in which the first chain member 12A and the second chain member 12B are integrated into a curved shape.

The present embodiment may be modified as follows. The present embodiment and the following modifications can be combined as long as the combined modifications remain technically consistent with each other.

Figure 6:
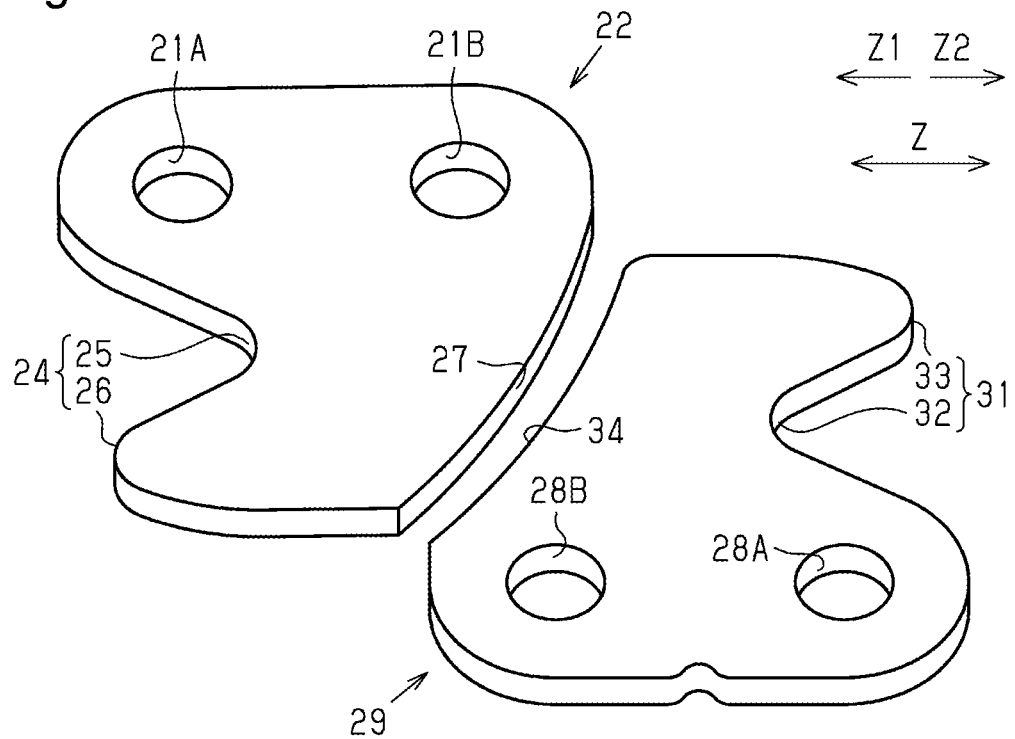
FIG. 6 is a perspective view showing link plates according to a first modification.

Referring to FIG. 6, as viewed in the front-rear direction Y coinciding with the axial direction of the pin holes 21A, 21B, 28A, 28B, the first mating part 27 of the first link plate 22 and the second mating part 34 of the second link plate 29 may be shaped such that the contour of one of the link plates is recessed in the retreating direction Z2 and the contour of the other link plate is projected in the retreating direction Z2. This structure allows the first mating part 27 to mate with the second mating part 34 such that the projection fits into the recess.

Figure 7:
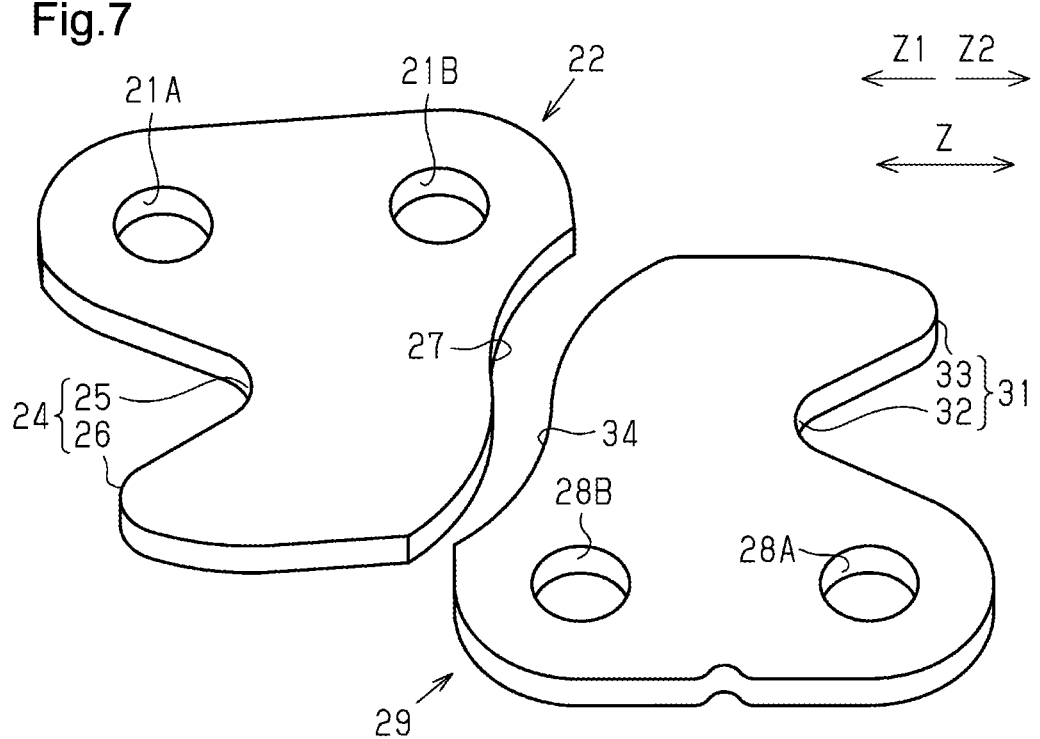
FIG. 7 is a perspective view showing link plates according to a second modification.

Referring to FIG. 7, as viewed in the front-rear direction Y coinciding with the axial direction of the pin holes 21A, 21B, 28A, 28B, the contour of the first mating part 27 of the first link plate 22 and the second mating part 34 of the second link plate 29 may each include a corrugated mating surface shaped to have a recess and a projection. This structure allows the first mating part 27 to mate with the second mating part 34 such that the projection fits into the recess more strongly.

Figure 8:
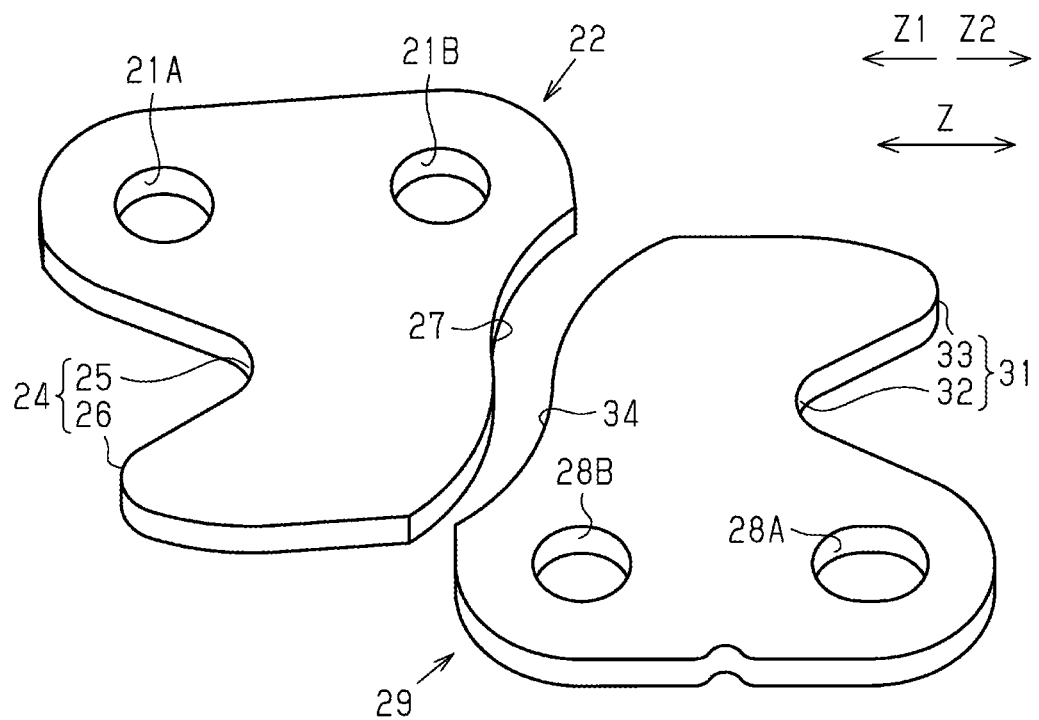
FIG. 8 is a perspective view showing link plates according to a third modification.

Referring to FIG. 8, in at least one of the first link plate 22 and the second link plate 29 (e.g., the second link plate 29), at least one of the pin holes 28A, 28B may be an elongated hole extending in the advancing/retreating direction Z, not a circular hole.

The first distance D1 between the first and second pin holes 21A, 21B of each first link plate 22 and the second distance D2 between the first and second pin holes 28A, 28B of the corresponding second link plate 29 may be changed. That is, by changing the first distance D1 and the second distance D2, each defining a chain pitch, the degree of curvature is changed when the first chain member 12A and the second chain member 12B are engaged with each other so as to be integrated into a curved shape. In this case, it is preferred that the first recess-side distance R1, first projection-side distance C1, and first angle θ1 of the first link plate 22 and the second recess-side distance R2, second projection-side distance C2, and second angle θ2 of the second link plate 29 be changed in correspondence with the changes in the first distance D1 and the second distance D2.

When the first chain member 12A and the second chain member 12B are advanced in the advancing direction Z1 to be engaged and integrated with each other, the engagement chain 12 may be curved with the second chain member 12B located on the inner peripheral side. This structure is achieved by, for example, setting the first distance D1 to be greater than the second distance D2 or setting the first angle θ1 to be smaller than the second angle θ2, unlike the embodiment.

A structure may be employed in which one of the first mating part 27 of the first link plate 22 and the second mating part 34 of the second link plate 29 is a projection and the other one is a mating surface (e.g., inclined surface) in contact with the projection.

REFERENCE SIGNS LIST

11) Movable Body Movement Device; 12) Engagement Chain; 12A) First Chain Member; 12b) Second Chain Member; 15) Movable Body; 21A) First Pin Hole; 21B) Second Pin Hole; 22) First Link Plate; 23) Coupling Pin; 24) First Engagement Part; 25) First Recess; 26) First Projection; 27) First Mating Part; 28A) First Pin Hole; 28B) Second Pin Hole; 29) Second Link Plate; 30) Coupling Pin; 31) Second Engagement Part; 32) Second Recess; 33) Second Projection; 34) Second Mating Part; C1) First Projection-side Distance; C2) Second Projection-side Distance; D1) First Distance; D2) Second Distance; H1) First Recess Depth; H2) Second Recess Depth; L1, L2) Straight Line; R1) First Recess-side Distance; R2) Second Recess-side Distance; X) Bifurcating Direction; Y) Front-Rear Direction; Z) Advancing/Retreating Direction; Z1) Advancing Direction; Z2) Retreating Direction; θ1) First Angle; θ2) Second Angle

The invention claimed is:

1. An engagement chain, comprising a first chain member and a second chain member that are capable of selectively advancing and retreating, wherein
the first chain member and the second chain member are engaged so as to be integrated with each other by moving in an advancing direction and disengaged from each other to bifurcate by moving in a retreating direction from an engaged state in which the first chain member and the second chain member are integrated with each other, wherein
the first chain member includes first link plates and coupling pins, the first link plates each including a first pin hole and a second pin hole arranged in the advancing direction and the retreating direction, the first link plates being arranged in series in the advancing direction and the retreating direction such that the first pin hole of one of the first link plates and the second pin hole of an other one of the first link plates adjacent to the one of the first link plates overlap each other, and the first link plates being pivotally coupled to each other by the coupling pins inserted through the first pin holes and the second pin holes with the first link plates arranged in series,
the second chain member includes second link plates and coupling pins, the second link plates each including a first pin hole thereof and a second pin hole thereof arranged in the advancing direction and the retreating direction, the second link plates being arranged in series in the advancing direction and the retreating direction such that the first pin hole of one of the second link plates and the second pin hole of an other one of the second link plates adjacent to the one of the second link plates overlap each other, and the second link plates being pivotally coupled to each other by the coupling pins inserted through the first pin holes and the second pin holes with the second link plates arranged in series,
the first pin hole of the first link plate is spaced from the second pin hole of the first link plate by a first distance,
the first pin hole of the second link plate is spaced from the second pin hole of the second link plate by a second distance, and
the first distance is shorter than the second distance.

2. The engagement chain according to claim 1, wherein
the first link plates each include a first engagement part and a first mating part, the first engagement part being located at an end of the first link plate on a leading side in the advancing direction, and the first mating part being located at an end of the first link plate on a leading side in the retreating direction,
the first engagement part of each of the first link plates includes a first recess and a first projection, the first recess being notched such that the retreating direction coincides with a depth direction of the first recess, and the first projection protruding from a position located on an opposite side of the first recess from the first pin hole and the second pin hole of the first link plate when the first recess is viewed in the advancing direction such that the advancing direction coincides with a protruding direction of the first projection,
the second link plates each include a second engagement part and a second mating part, the second engagement part being located at an end of the second link plate on the leading side in the retreating direction and being engageable with the first engagement part, and the second mating part being located at an end of the second link plate on the leading side in the advancing direction and being capable of mating with the first mating part,
the second engagement part of each of the second link plates includes a second recess and a second projection, the second recess being notched such that the advancing direction coincides with a depth direction of the second recess and such that the first projection of the first engagement part is insertable into the second recess, and the second projection protruding from a position located on an opposite side of the second recess from the first pin hole and the second pin hole of the second link plate when the second recess is viewed in the retreating direction such that the retreating direction coincides with a protruding direction of the second projection and such that the second projection is insertable into the first recess of the first engagement part, the first mating part of each of the first link plates includes an end face of the first link plate, the second mating part of each of the second link plates includes an end face of the second link plate, the end face of the first mating part and the end face of the second mating part extend in a direction intersecting obliquely with respect to the advancing direction and the retreating direction, an orthogonal direction is orthogonally extended to a direction in which the first mating part and the second mating part extend, in the orthogonal direction, the first mating part of the first link plate is spaced from a bottom of the first recess of the first engagement part of the first link plate by a first recess-side distance, in the orthogonal direction, the second mating part of the second link plate is spaced from a tip of the second projection of the second engagement part of the second link plate by a second projection-side distance, in the orthogonal direction, the first mating part of the first link plate is spaced from a tip of the first projection of the first engagement part of the first link plate by a first projection-side distance, in the orthogonal direction, the second mating part of the second link plate is spaced from a bottom of the second recess of the second engagement part of the second link plate by a second recess-side distance, and a sum of the first recess-side distance and the second projection-side distance is smaller than a sum of the first projection-side distance and the second recess-side distance.

3. The engagement chain according to claim 2, wherein the first mating part is in planar contact with the second mating part when the first chain member and the second chain member are engaged so as to be integrated with each other.

4. The engagement chain according to claim 2, wherein
as viewed in an axial direction of the first pin hole and the second pin hole of each of the first link plates, the end face of the first mating part in the first link plate defines an upward slope toward the leading side in the advancing direction from a side where the first pin hole and the second pin hole are located, as viewed in an axial direction of the first pin hole and the second pin hole of each of the second link plates, the end face of the second mating part in the second link plate defines a downward slope toward the leading side in the retreating direction from a side where the first pin hole and the second pin hole are located, the first mating part intersects a straight line connecting the first pin hole and the second pin hole of the first link plate to each other at a first angle, the first angle being an acute angle, the second mating part intersects a straight line connecting the first pin hole and the second pin hole of the second link plate to each other at a second angle, the second angle being an acute angle, and the first angle is greater than the second angle.

5. A movable body movement device, comprising:
the engagement chain according to claim 1; and
a movable body coupled to the engagement chain and movable in the advancing direction and the retreating direction together with the engagement chain.

* * * * *